United States Patent
Longo

[11] Patent Number: 5,876,147
[45] Date of Patent: Mar. 2, 1999

[54] LOCKING DEVICE FOR TELESCOPIC RODS

[76] Inventor: Renato Longo, 14, via G. Marconi, Pieve Di Curtarolo, Italy, 35010

[21] Appl. No.: 816,323

[22] Filed: Mar. 13, 1997

[30] Foreign Application Priority Data

Jun. 18, 1996 [IT] Italy .................................. PD96057 U

[51] Int. Cl.⁶ ....................................................... F16B 2/14
[52] U.S. Cl. ..................................... 403/109.5; 403/374.3; 16/115
[58] Field of Search ..................................... 403/109, 110, 403/377, 370, 371, 297, 104, 307, 373, 374, 109.5, 374.3; 16/115; 248/188.5

[56] References Cited

U.S. PATENT DOCUMENTS

| 653,642 | 7/1900 | Darling .................................. 403/104 |
| 1,000,149 | 8/1911 | Bristol .................................. 403/307 X |
| 2,261,505 | 11/1941 | Schlesinger ......................... 403/377 X |
| 2,298,380 | 10/1942 | Hood .................................... 248/188.5 |
| 2,915,327 | 12/1959 | Kreske ................................ 403/371 X |
| 4,152,086 | 5/1979 | Achenbach et al. ................ 403/297 X |
| 4,154,545 | 5/1979 | Pinto et al. ......................... 403/109 X |
| 4,238,164 | 12/1980 | Mazzolla ................................ 403/109 |
| 4,856,929 | 8/1989 | Smamlik et al. ...................... 403/297 |
| 4,858,926 | 8/1989 | Cabianca ............................ 403/109 X |
| 5,193,932 | 3/1993 | Wu ....................................... 403/307 X |
| 5,458,427 | 10/1995 | Simond ............................... 403/370 X |

*Primary Examiner*—Harry C. Kim
*Attorney, Agent, or Firm*—Dowell & Dowell, P.C.

[57] ABSTRACT

A reversible expansion locking element for selectively securing two tubes or rods in telescoping relationship with respect to one another wherein the element has oppositely oriented outwardly expandable conical threaded portions separated by a central protrusion. The expansion element is receivable within a first hollow tube and is adapted to receive a threaded end of the other tube or rod.

6 Claims, 1 Drawing Sheet

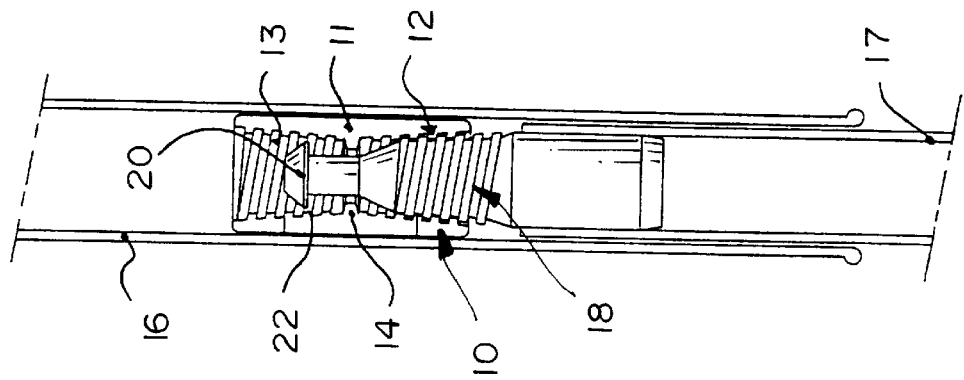
FIG. 4
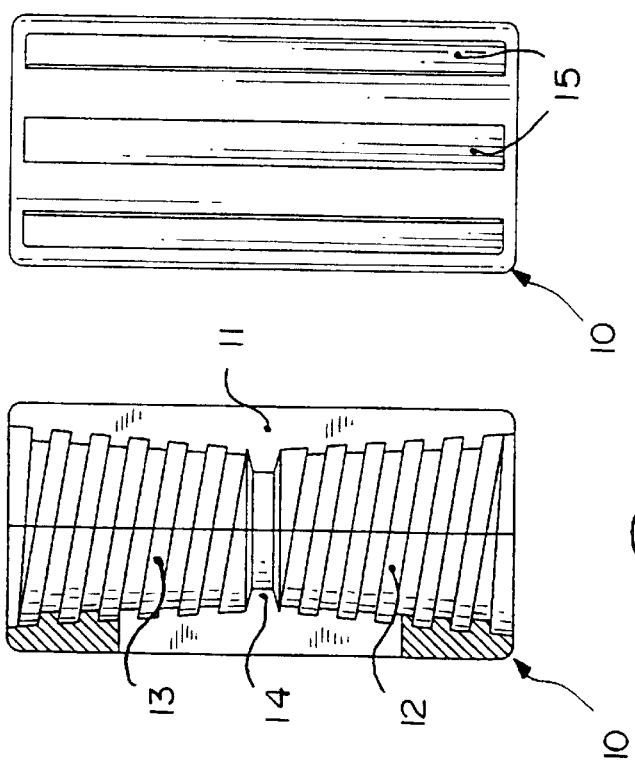
FIG. 1
FIG. 3
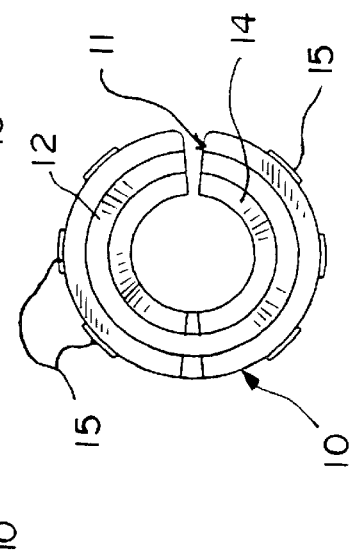
FIG. 2

LOCKING DEVICE FOR TELESCOPIC RODS

BACKGROUND OF THE INVENTION

The present invention relates to the sector of household accessories and in particular concerns a locking device for the various elements of telescopic rods. Said telescopic units can be used to support brooms, flags, clothes-stands, hooks, curtains and any other object that can be manually moved and supported. In order to simplify the description, the application regarding brooms will be described here below, though this is not to be intended as a limitation. In fact, brooms are known, the handle of which is divided in two or more sliding telescopic tubes positioned one inside the other.

Obviously, it is necessary to adopt a system to lock the two tubes, so that the tubes cannot slide reciprocally and that the length of the broom can be adjusted according to the need.

These brooms are particularly practical to clean either floors and ceilings, even if very high, and walls, too. However, there are some problems with the assembly of such tubes one inside the other and with locking them. At present an external metal ring is used to tighten the two tubes reciprocally. Such metal ring screws on a threaded head of the outer tube, which is provided with slits, thus narrowing it and obtaining the locking on the inner tube. Such devices are expensive and not aesthetical in appearence.

At present also expansion elements are used, which comprise a cylindrical body with an internal, truncated cone-shaped thread on one side, while the other side is half closed and provided with one or more slits to facilitate the expansion of the element itself.

A separating device, integral with the inner tube, is inserted into the expansion element, which can slide in the outer tube. Such a separating device comprises a truncated cone-shaped point provided with a thread, which screws inside the expansion element, thus widening it and making it exert a certain pressure on the inner walls of the outer tube. In this way, through the rotation of the inner and outer tube in opposite directions, it is possible to obtain the screwing of the separating device on the expansion element, with consequent locking of the two tubes.

This system can obviously be applied to two or more telescopic tubes. The drawback of this system is that it is mono-directional and that it makes it necessary to decide during the assembly phase in which direction the tightening element made up by the expander must be installed. This system may lead to mistakes in the assembly, which make it necessary to put aside the rods assembled incorrectly, to disassemble them in order to reverse the expander and to reassemble the unit.

At the moment, these inconveniences can be avoided only by proceeding very slowly and carefully.

SUMMARY OF THE INVENTION

A new locking device, comprising a cylindrical expansion element provided with two internal, truncated cone-shaped threads, has been designed and implemented in order to solve this problem.

This cylinder is provided with two series of slits at its ends or preferably with a single slit along its whole length, in such a way as to make it possible to separate and open it.

Two truncated cone-shaped threads converging on the center are provided on the inner surfaces.

A protrusion that serves to hold the head of the separating device is provided on the center line of the expansion cylinder, in such a way as to prevent the inner tube from coming out of the outer tube.

The outer surface of the expansion element is provided with knurls and protrusions that facilitate the adhesion of the expansion element to the inner surface of the outer tube.

The expansion element described above can be inserted in any direction and can house the separating element in any case.

Therefore, during the assembly phase, the cylindrical expansion element is positioned in the outer tube after fixing the separating element to the head of the inner tube. This element can be inserted manually or automatically, with no need to verify its orientation. Successively, the separating point of the inner tube is pushed against the expansion element until the head of the separating element is locked inside the expansion element.

The present invention is directed to a locking device for telescopic rods, comprising an expansion cylinder provided with two series of slits at its ends or preferably with a single slit along its whole length, wherein two truncated cone-shaped threads converging on the center are provided on the inner surfaces.

The following is just an example among many of the practical applications of the invention in question, illustrated in the attached drawings wherein:

FIG. 1 is a top plan view of the cylindrical expansion and locking element of the present invention;

FIG. 2 is an end view of the expansion locking element of FIG. 1;

FIG. 3 is a cross-sectional view taken longitudinally of the locking element of FIG. 1;

FIG. 4 is a cross-sectional illustrational view showing the expansion locking element of FIGS. 1–3 used to retain a threaded extension member so as to join two tubes or rods in telescoping engagement with one another.

DESCRIPTION OF THE PREFERRED EMBODIMENT

FIGS. 1–3 show three views of the expansion locking element 10 including a longitudinal slit 11 which allows radial expansion of the element outwardly with respect to a longitudinal axis A—A thereof. The expansion element includes oppositely oriented truncated cone-shaped threads 12 and 13 which converge toward a central protrusion 14 extending inwardly toward the longitudinal axis A—A of the element. The expansion locking element further includes external elongated protrusions 15 which are used to facilitate locking engagement of the element to the inner surface of a first or outer rod or tube as shown at 16 in FIG. 4. Although the longitudinal slit 11 is shown as extending along the full length of the element, in some instances, the longitudinal slit may only extend along the cone-shaped threaded portions 12 and 13 and still permit an expansion of the element to adhere the element within the outer tube 16.

In view of the oppositely oriented cone-shaped threaded portions 12 and 13, the expansion element 10 may be inserted within the outer tube 16 such that either of the threaded portions 12 or 13 are oriented toward the open end of the tube, as shown in FIG. 4. Thus, the locking element of the present invention is reversibly insertable within the outer tube 16 to thereby facilitate ease of assembly.

FIG. 2 shows the expansion element utilized to selectively assemble an inner tube or rod 17 in telescoping relationship with respect to the outer tube 16. The inner tube or rod 17 includes a separating or expander element formed as a truncated cone-shaped threaded portion 18 which is designed to cooperatively threadingly engage with either of the truncated cone-shaped threaded portions 12 and 13 of the expansion locking element. The expander element further includes an outwardly flared semi-spherical head 20 which extends forwardly of the threaded portion 18 thereof and which includes an outwardly extending annular flange 22 which is engageable with the central protrusion 14 of the expansion locking element 10 when the expander element has been inserted beyond the central portion of the locking element, as shown in FIG. 4, such that the head 20 thereof extends into the opposing truncated cone-shaped threads 13 of the locking element. Because of the outwardly extending annular flange 22, the expander element 18 becomes locked within, or is prevented from removal from within, the locking element 10 after the expander element of the inner tube 17 has been threadingly received within one of the cone-shaped threads of the expansion locking element, as shown in FIG. 4. However, the inner rod may be threadingly adjustable with respect to the expansion locking element so as to decrease the expansion thereof to allow an adjustable telescoping arrangement of the inner rod or tube with respect to the outer tube.

The above are the basic outlines of the invention on the basis of which one of ordinary skill in the art will be able to provide for implementation. Therefore, any change which may be required for implementation is to be regarded as completely within the scope of the present invention.

I claim:

1. A locking device adapted to secure two rods in adjustable telescoping relationship with respect to one another and wherein one of the rods is hollow having an inner diameter of a size for cooperatively and slidingly receiving the locking device therein and wherein the other rod includes a threaded expander portion from which extends a flanged head, the locking device comprising:

a tubular body having an elongated axis with opposite ends and a central portion, a pair of oppositely oriented truncated conically configured threaded portions extending inwardly from each of said opposite ends of said body and which converge inwardly and terminate in spaced relationship with respect to one another adjacent said central portion of said body, said tubular body includes an intermediate protrusion which extends inwardly toward said axis of said body intermediate said threaded portions, and a slit formed in said body so as to extend along at least a portion of a length of each of said threaded portions so that said body is adapted to be outwardly expandable within said one of the rods to permit the flanged head of the threaded expander portion of the other rod to pass beyond said protrusion when the threaded expander portion is threadingly engaged with one of said threaded portions and to expand said body to frictionally engage said body within said one of said rods.

2. The locking device of claim 1 wherein said slit extends along substantially an entire length of said tubular body.

3. The locking device of claim 1 wherein said tubular body includes outer protrusions adapted to engage an inner surface of said one of said rods in which the locking device is selectively seated.

4. An extendable handle comprising:

an outer tubular member and an inner rod having a threaded expander end portion, a locking device including a tubular body having an elongated axis with opposite ends and a central portion, said tubular body including truncated conically configured threaded portions extending inwardly from each of said opposite ends thereof which are in spaced relationship with respect to one another at said central portion of said tubular body, said tubular body being positioned within said outer tubular member with one of said threaded portions oriented to receive said threaded expander portion of said inner rod when said inner rod is inserted within said outer tubular member, said tubular body also including a slit therein which extends along at least a portion of a length of each of said threaded portions so that said tubular body is adapted to be outwardly expandable within said outer tubular member when said threaded expander end portion of said inner rod is threadingly engaged with said one of said threaded portions of said tubular body, said tubular body including a central protrusion extending inwardly toward said axis thereof intermediate said threaded portions, said inner rod including a head extending forwardly of said threaded expander end portion and said head having an outwardly extending flange, said head being shaped so as to allow said head to pass beyond said protrusion when said threaded expander end portion is threadingly received within said one of said threaded portions of said locking device and said flange of said head being engageable with said protrusion to prevent the withdrawal of said inner rod from said outer tubular member after said threaded expander end portion has been threadingly received within said one of said threaded portions of said tubular body.

5. The extendable handle of claim 4 in which said slit in said tubular body extends substantially along an entire length thereof.

6. The extendable handle of claim 4 in which said tubular body includes outer protrusions extending therefrom for facilitating frictional engagement of said tubular body with respect to said inner surface of said outer tubular member.

* * * * *